Sept. 18, 1962 H. T. BRIDGES, JR 3,054,121
FOLDING COT FOR AUTOMOBILES
Filed Jan. 3, 1961 2 Sheets-Sheet 1

INVENTOR
HERMAN T. BRIDGES, JR.

BY J. Hanson Boyden,
ATTORNEY

Sept. 18, 1962  H. T. BRIDGES, JR  3,054,121
FOLDING COT FOR AUTOMOBILES
Filed Jan. 3, 1961  2 Sheets-Sheet 2

INVENTOR
HERMAN T. BRIDGES, JR.
BY J. Hanson Boyden,
ATTORNEY

United States Patent Office 3,054,121
Patented Sept. 18, 1962

3,054,121
FOLDING COT FOR AUTOMOBILES
Herman T. Bridges, Jr., 210 College Drive, Abilene, Tex.
Filed Jan. 3, 1961, Ser. No. 80,234
2 Claims. (Cl. 5—118)

This invention relates to cots or beds, and more particularly to folding cots for use in automobiles.

The general object of the invention is to provide a cot which may be set up in such manner as to occupy the space above the rear seat and between the front and rear seats of a sedan type automobile, and which, when not in use, may be readily folded so as to require a minimum of storage space.

A specific object is to so design the four supporting legs of such a cot that the sides of the free end portions of two of the legs will rest upon the surface of the rear seat cushion, while the free ends of the other two legs will rest upon the floor, thus providing storage space for luggage beneath the cot or bed.

Another specific object of the invention is to devise an improved, quick-detachable coupling for connecting the ends of the side rails of the cot to the upper ends of the supporting legs.

With the above and other objects in view, and to improve generally on the details of such devices, the invention consists in the construction and combination of parts hereinafter described and claimed, and illustrated in the accompanying drawings, forming part of this specification, and in which:

Figure 2:
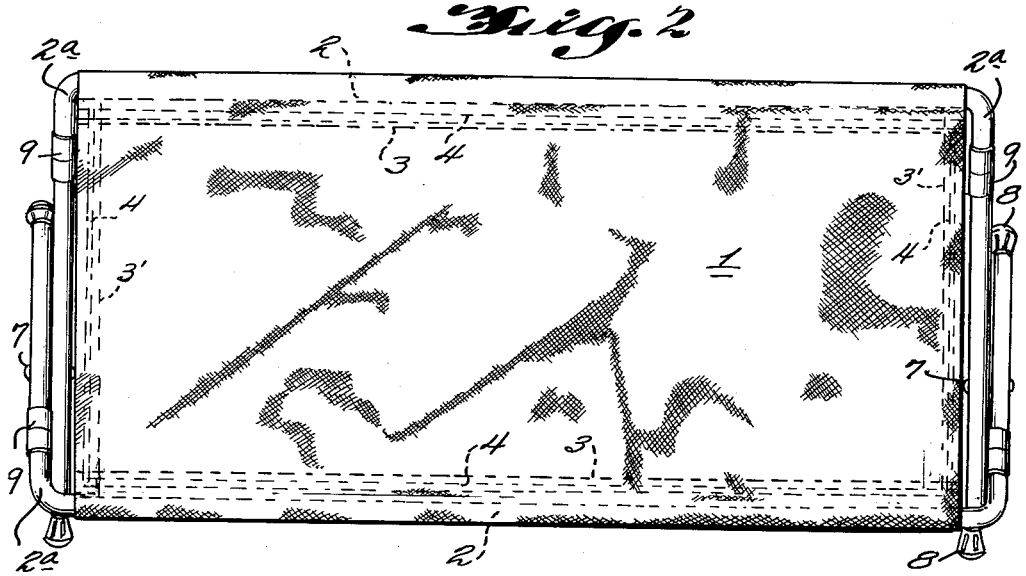
FIG. 2 is a plan view of the cot itself.

Referring to the drawings in detail, my improved cot comprises a sheet of fabric 1 secured at its edges to and extending between a pair of rigid side rails 2. The ends of these side rails extend beyond the fabric sheet and are bent at substantial right angles as indicated at 2ª. The fabric sheet is preferably looped around the side rails as shown at 3 in FIG. 2 and is also folded over on itself along the ends, to provide a double thickness, as indicated at 3' in FIG. 2. The turned over portions along both the ends and sides are held in place by one or more rows of stitching 4.

The side rails and fabric sheet are supported on two pair of crossed legs 5 and 6, the legs of each pair being pivotally connected as at 7.

Both the side rails and legs are made of tubular stock, and the ends of the legs may have rubber tips 8 attached thereto if desired.

Figure 6:
FIG. 6 is a fragmentary longitudinal section on an enlarged scale showing the improved coupling which I employ to unite the legs and side rails of the cot.

In order to unite the upper ends of the legs with the side rails, I employ a tubular coupling sleeve 9, best shown in FIG. 6. This sleeve preferably has a bead 10 formed on the inside thereof about midway of its length to act as a stop against which the ends of the legs such as 6 abut, when inserted in the coupling. One of these coupling sleeves 9 is fitted over the upper ends of each leg and is secured to the legs in any suitable way as by means of a dimple 11 formed by striking the assembled parts with a punch.

The bent ends 2ª of the side rails may be inserted in the couplings 9 which are permanently attached to the legs 5 and 6, thus rigidly uniting the legs with the side rails. When it is desired to fold the cot for storage, the ends of the side rails may be readily withdrawn from the couplings 9. Thus, I provide a quick-detachable connection between the legs and the side rails.

In order to hold the pivotally connected pairs of legs in operative supporting position, I provide a brace comprising a pair of links 12 and 14, the link 12 being pivoted to the leg 5 at 13 and the link 14 being pivoted to the leg 6 at 15, the two links being pivoted together as at 16.

Figure 5:
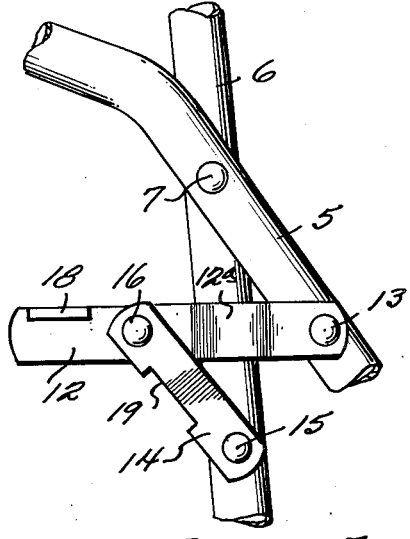
FIG. 5 is a fragmentary side elevation similar to FIG. 3 but showing the parts in a different position.
Figure 4:
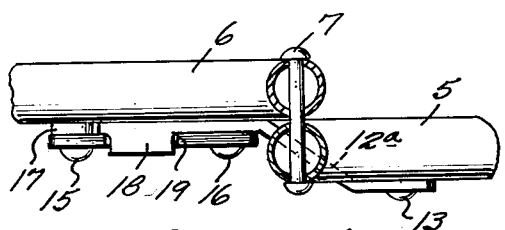
FIG. 4 is a section on the line 4—4 of FIG. 3 looking in the direction of the arrows.

By reference to FIGS. 4 and 5, it will be seen that the link 12 is formed with an offset portion 12ª so that it may fit flat against both of the legs, and the other link 14 is spaced from the leg 6 by a washer 17 so that the link 12 may be received between it and the leg 6.

Figure 3:
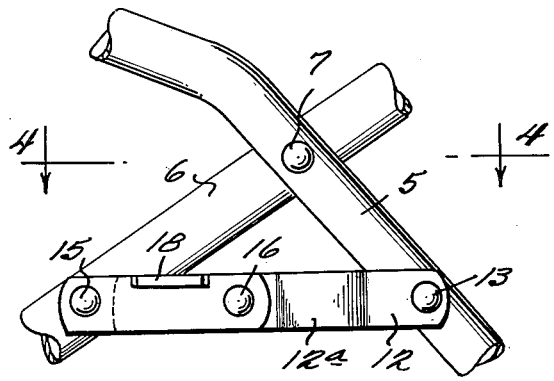
FIG. 3 is a fragmentary detail on an enlarged scale showing the construction of the folding legs and the brace which holds them in position.

The link 12 is formed with a laterally projecting lug 18 near its free end, and the link 14 is formed with a notch 19 in its edge adapted to receive this lug, as clearly shown in FIGS. 3 and 4, when the two links are in alinement. Thus, the links are securely locked together and the legs are held in operative position.

Figure 1:
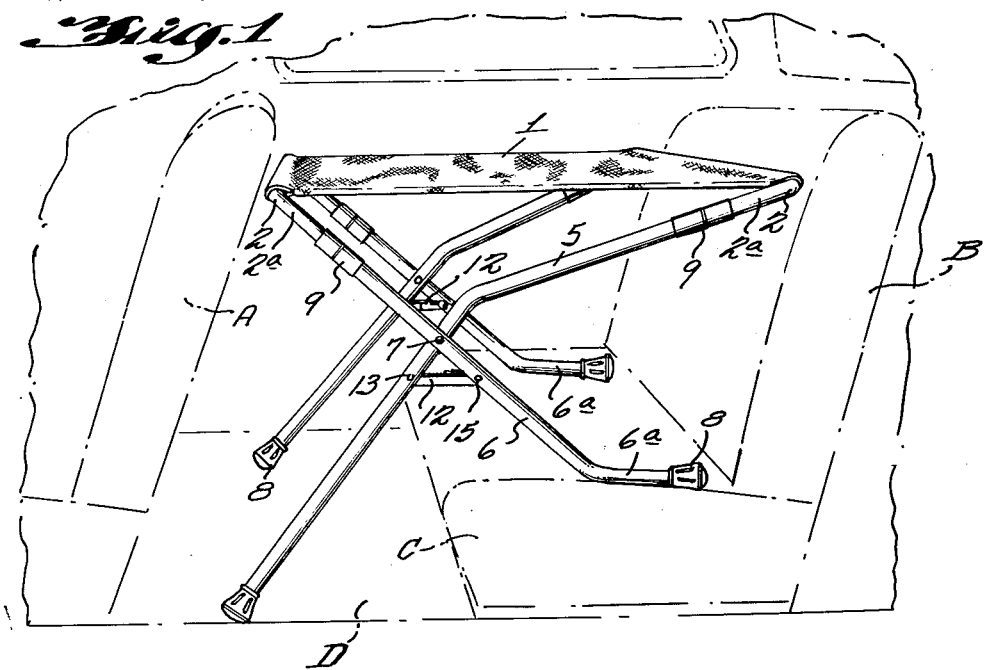
FIG. 1 is a perspecitve view of my improved cot as it appears when set up for use on the back seat of an automobile of the sedan type, the automobile seats being indicated in broken lines.

By reference to FIG. 1, it will be seen that one of the legs 5 of each crossed pair rests at its end on the floor D of the automobile. The other leg 6 of each pair extends diagonally downward from the pivot and is somewhat shorter and its free end is bent so as to extend rearwardly at a slight angle to the diagonal portion as shown at 6ª. The backs of the front and rear seats are indicated at A and B, respectively, and the cushion of the rear seat at C. It will be seen that by virtue of the legs 6 being slightly bent at their free ends, as above described, these free ends rest upon the surface of the cushion C of the rear seat. In other words, the angle of the portions 6ª is such as to conform substantially with the slope of the surface of the seat cushion, so that the sides of the leg portions 6ª lie flat upon the surface of the cushion.

It will further be seen that the lower ends of the legs 5 extend well below the plane of the bent end portions of the legs 6, so that when the legs 5 rest on the floor, and the sides of the bent end portions of the legs 6 engage the rear seat cushion, as shown, the side bars 2 lie in a substantially horizontal plane so as to support, in operative position, the fabric forming the bed bottom.

It will thus be understood that the length of my improved cot is substantially equal to the inside width of the automobile body and that the cot, when in use, occupies the space above the cushion of the rear seat and between the backs of the front and rear seats. Thus, although the bed is intended for use especially for children, it can readily accommodate an adult. Furthermore, because the bed is elevated almost to the level of the windows, the occupant will have better ventilation than if lying on the rear seat.

An important advantage of the invention also is that ample storage space for luggage is available beneath the bed and between the legs thereof.

Figure 7:
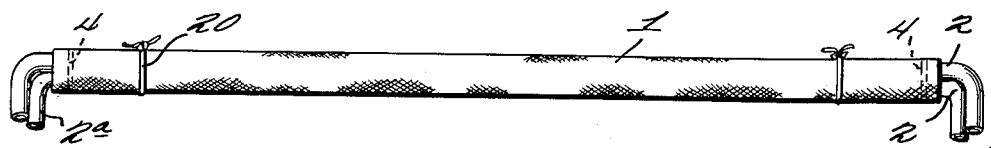
FIG. 7 is a view partly in side elevation and partly in perspective showing how the cot may be folded for storage when not in use.
Figure 7:
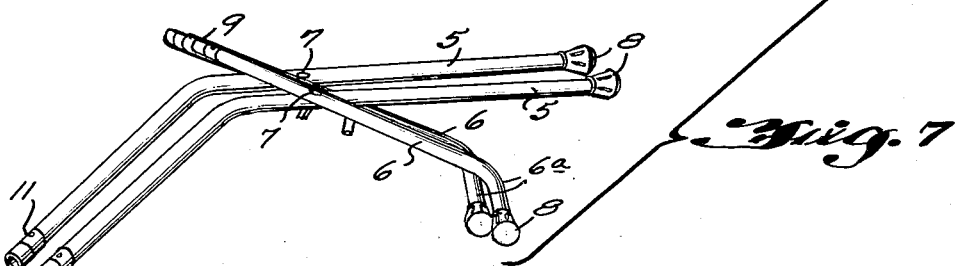

By reference to FIG. 7, it will be seen that when the legs are detached from the bent ends of the side rails, as above described, the fabric sheet 1 may be rolled about the side rails into a compact bundle and may be tied with a cord as at 20. At the same time, by swinging the pairs of legs about their pivots 7 into some such position as indicated in FIG. 5, in which the links 12 and 14 are disengaged and swung to a position at an angle to each other, the legs may be folded into a small space and, when assembled in parallelism as shown in FIG. 7, constitute a relatively small package which may be readily stored.

What I claim is:

1. A folding cot for automobiles having front and rear seats comprising a pair of side rails, a sheet of fabric attached along its opposite edges to said rails and extending between them, and a pair of pivotally connected, crossed supporting legs secured to each end of said side rails, said legs extending diagonally downward from the pivot, the ends of one leg of each pair being adapted to rest on the floor of the car between the front and rear seats, and the other leg of each pair being shorter, the end portions of such shorter legs being bent to extend rearwardly at a slight angle to the diagonal portion, so that the sides of said end portions are adapted to rest on the cushion of the rear seat, and the lower ends of said first mentioned legs extending well below the plane of the bent portions of said shorter legs.

2. A folding cot for automobiles having front and rear seats comprising a pair of side rails, a sheet of fabric attached along its opposite edges to said rails and extending between them, and a pair of pivotally connected, crossed supporting legs secured to each end of said side rails, the ends of one leg of each pair being adapted to rest on the floor of the car between the front and rear seats, and the other leg of each pair being shorter, the end portions of said shorter legs being bent at such an angle as to substantially conform with the slope of the surface of the cushion of the rear seat, whereby the sides of such end portions of the legs rest upon said rear seat cushion, and the lower ends of said first mentioned legs extend well below the plane of the bent portions of said shorter legs, whereby, when the cot is installed in an automobile, the said fabric sheet is supported in substantially horizontal position.

References Cited in the file of this patent

UNITED STATES PATENTS

| | | |
|---|---|---|
| D. 179,830 | Wilson | Mar. 5, 1957 |
| D. 188,895 | Joines | Sept. 27, 1960 |
| 115,598 | Free | June 6, 1871 |
| 560,669 | Abel | May 26, 1896 |
| 1,209,679 | Decker | Dec. 26, 1916 |
| 1,557,813 | Derse et al. | Oct. 20, 1925 |
| 1,580,404 | Brown | Apr. 13, 1926 |
| 2,460,712 | Peterson | Feb. 1, 1949 |

FOREIGN PATENTS

| | | |
|---|---|---|
| 161,027 | Australia | Feb. 9, 1955 |